United States Patent
Oliver

(10) Patent No.: US 10,110,283 B2
(45) Date of Patent: Oct. 23, 2018

(54) CONFIGURING COMPONENTS OF A BASE STATION TO IMPLEMENT DIVERSITY RECEPTION AND BEAMFORMING TRANSMISSION

(71) Applicant: Verizon Patent and Licensing Inc., Arlington, VA (US)

(72) Inventor: Charles T. Oliver, Alpharetta, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 212 days.

(21) Appl. No.: 15/138,883

(22) Filed: Apr. 26, 2016

(65) Prior Publication Data

US 2017/0310369 A1    Oct. 26, 2017

(51) Int. Cl.
| | |
|---|---|
| H04B 7/0404 | (2017.01) |
| H04L 25/02 | (2006.01) |
| H04B 7/06 | (2006.01) |
| H04B 7/08 | (2006.01) |

(52) U.S. Cl.
CPC ......... *H04B 7/0404* (2013.01); *H04B 7/0617* (2013.01); *H04B 7/0848* (2013.01); *H04L 25/0262* (2013.01)

(58) Field of Classification Search
CPC .. H04B 7/0404; H04B 7/0617; H04L 25/0262
See application file for complete search history.

(56) References Cited

U.S. PATENT DOCUMENTS

| | | | | |
|---|---|---|---|---|
| 6,339,703 | B1* | 1/2002 | Otsuka | H01Q 21/29 455/269 |
| 9,692,546 | B2* | 6/2017 | Lam | H04J 14/0242 |
| 2005/0018634 | A1* | 1/2005 | Mantha | H04B 1/7117 370/334 |
| 2007/0205955 | A1* | 9/2007 | Korisch | H01Q 1/246 343/853 |

OTHER PUBLICATIONS

Wikipedia, "Antenna diversity," https://en.wikipedia.org/wiki/Antenna_diversity, Mar. 18, 2016, 4 pages.
Wikipedia, "Base transceiver station," https://en.wikipedia.org/wiki/Base_transceiver_station, Mar. 2, 2016, 3 pages.
Wikipedia, "Beamforming," https://en.wikipedia.org/wiki/Beamforming, Mar. 17, 2016, 6 pages.
Wikipedia, "Diversity scheme," https://en.wikipedia.org/wiki/Diversity_scheme, Mar. 22, 2016, 2 pages.

* cited by examiner

*Primary Examiner* — Hassan Kizou
*Assistant Examiner* — Abdullahi Ahmed

(57) ABSTRACT

A base station may comprise a first antenna connected to a first transceiver, a first multiplexer, and a second multiplexer. The base station may comprise a second antenna connected to a second transceiver, the first multiplexer, and the second multiplexer. The base station may comprise a first circulator connected to the first transceiver and the first multiplexer. The base station may comprise a second circulator connected to the second transceiver and the first multiplexer. The base station may comprise a third circulator connected to the first transceiver and the second multiplexer. The base station may comprise a fourth circulator connected to the second transceiver and the second multiplexer.

20 Claims, 5 Drawing Sheets

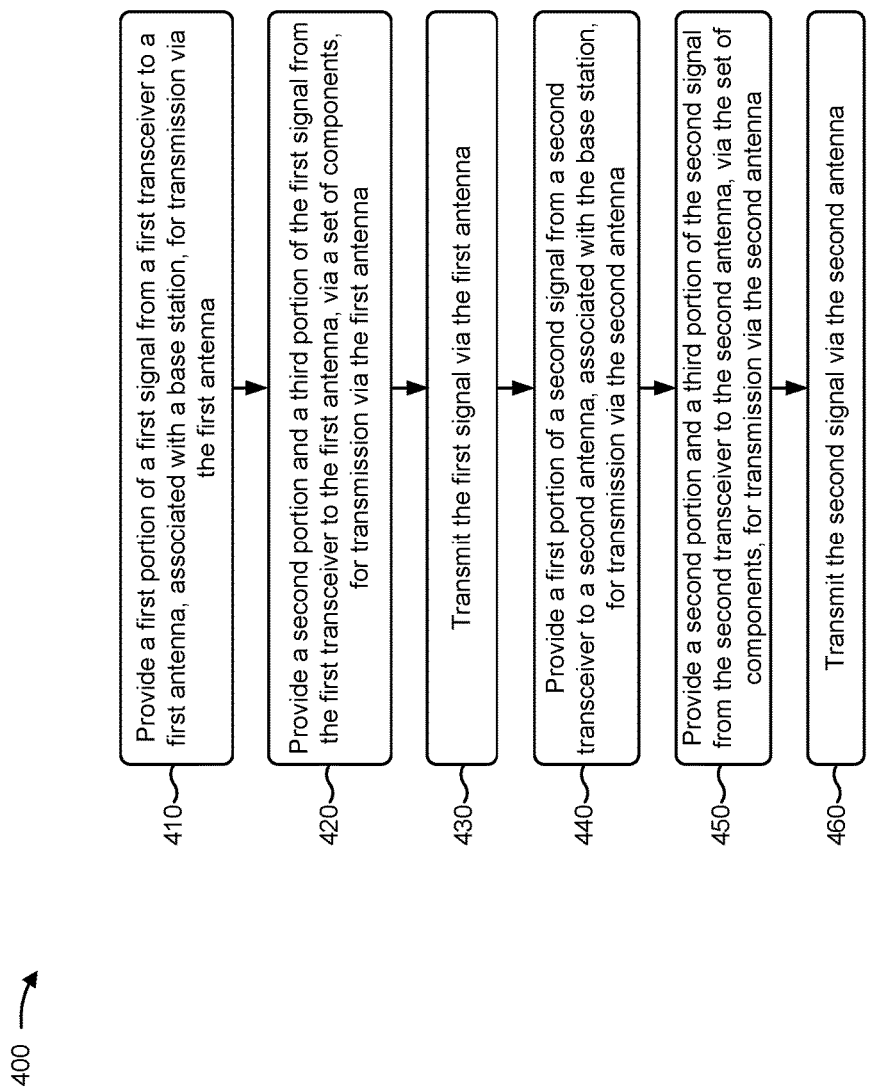

CONFIGURING COMPONENTS OF A BASE STATION TO IMPLEMENT DIVERSITY RECEPTION AND BEAMFORMING TRANSMISSION

BACKGROUND

A network operator may implement one or more techniques to improve reception and transmission of signals, such as radio frequency (RF) signals. For example, the network operator may implement antenna diversity reception to improve reception of a signal by using two or more spatially diverse, or separated, antennas to provide multiple observations of the incoming signal. As another example, the network operator may use beamforming transmission to improve transmission of a signal by using spatially proximate antenna elements, such as in a phased array, to produce constructive interference when transmitting the signal.

BRIEF DESCRIPTION OF THE DRAWINGS

FIG. 4 is a flow chart of an example process for implementing beamforming transmission using the same configuration of devices and/or components of the base station.

DETAILED DESCRIPTION OF PREFERRED EMBODIMENTS

The following detailed description of example implementations refers to the accompanying drawings. The same reference numbers in different drawings may identify the same or similar elements.

A base station may be configured to implement one or more techniques for improving reception and/or transmission of a signal (e.g., a radio frequency (RF) signal, associated with a wireless communication, transmitted via a particular RF spectrum band). To improve reception of a signal, the base station may be configured to implement an antenna diversity reception technique (sometimes referred to as "diversity reception" herein). Diversity reception may include using spatially diverse, or separated, antenna elements to improve reception of the signal. For example, implementing diversity reception may reduce destructive interference resulting from a lack of line-of-sight with a transmitter by using spatially diverse antenna elements to provide multiple observations of the signal.

To improve transmission of a signal, the base station may be configured to implement a beamforming transmission technique, where spatially proximate antenna elements are used to produce constructive interference when transmitting the signal. For example, beamforming transmission may increase the strength of the signal by using spatially proximate antenna elements in a phased array to amplify the transmission of the signal.

In some cases, concurrent implementation of diversity reception and beamforming transmission may be difficult based on the different spatial configurations of antenna elements used by these two techniques. For example, the spatially diverse configuration used by diversity reception may exclude the spatially proximate configuration used by beamforming transmission. As another example, the spatially proximate configuration used by beamforming transmission may exclude the spatially diverse configuration used by diversity reception. In other words, implementing one technique of diversity reception or beamforming transmission may prevent implementation of the other technique.

Implementations described herein enable a base station to be configured for concurrent implementation of diversity reception and beamforming transmission. This improves reception and/or transmission of signals via the base station by enabling the base station to concurrently use spatially diverse antenna elements to improve reception of signals and spatially proximate antenna elements to improve transmission of signals.

Figure 1A:
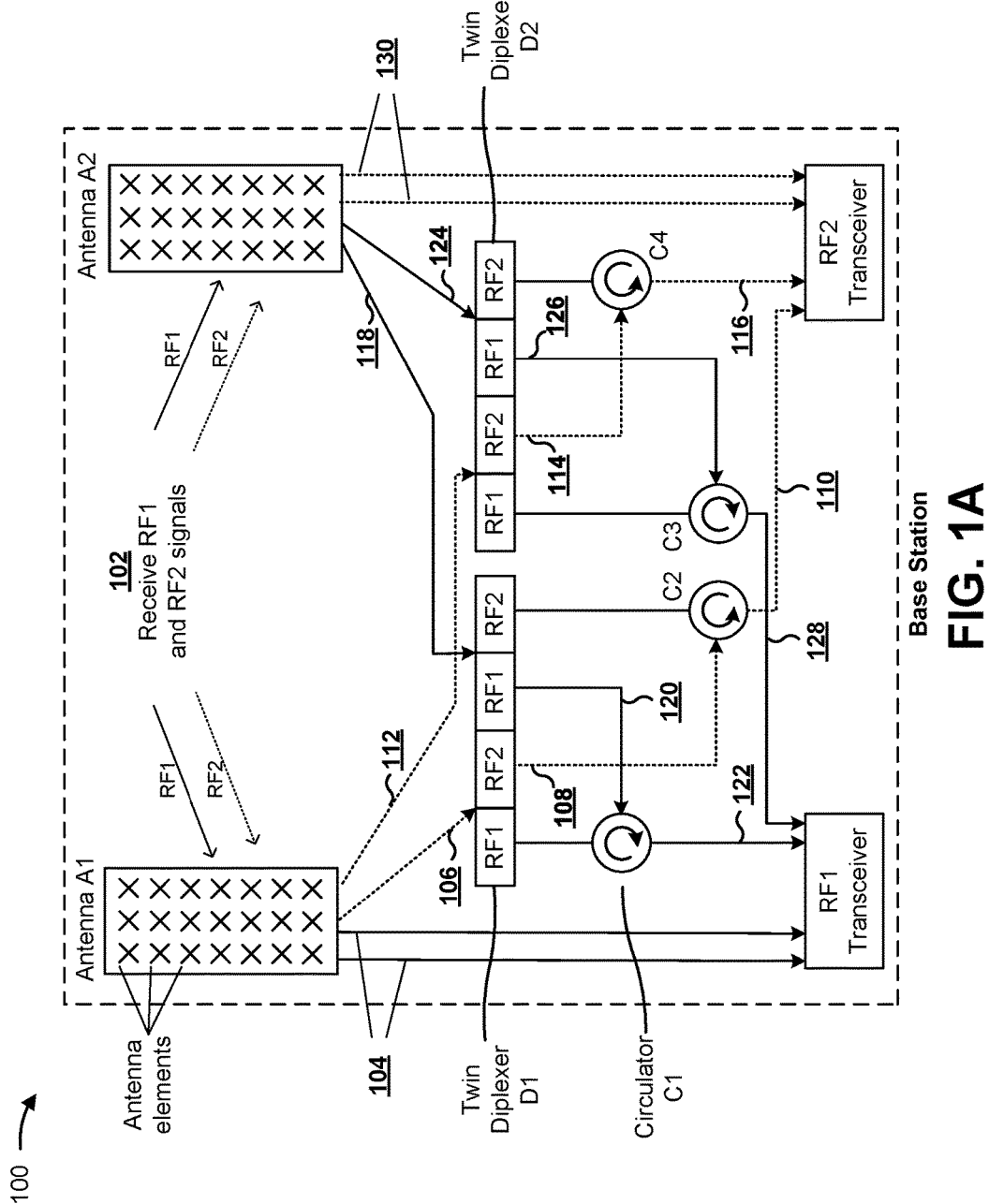
FIGS. 1A and 1B are diagrams of an overview of an example implementation described herein.
Figure 1B:
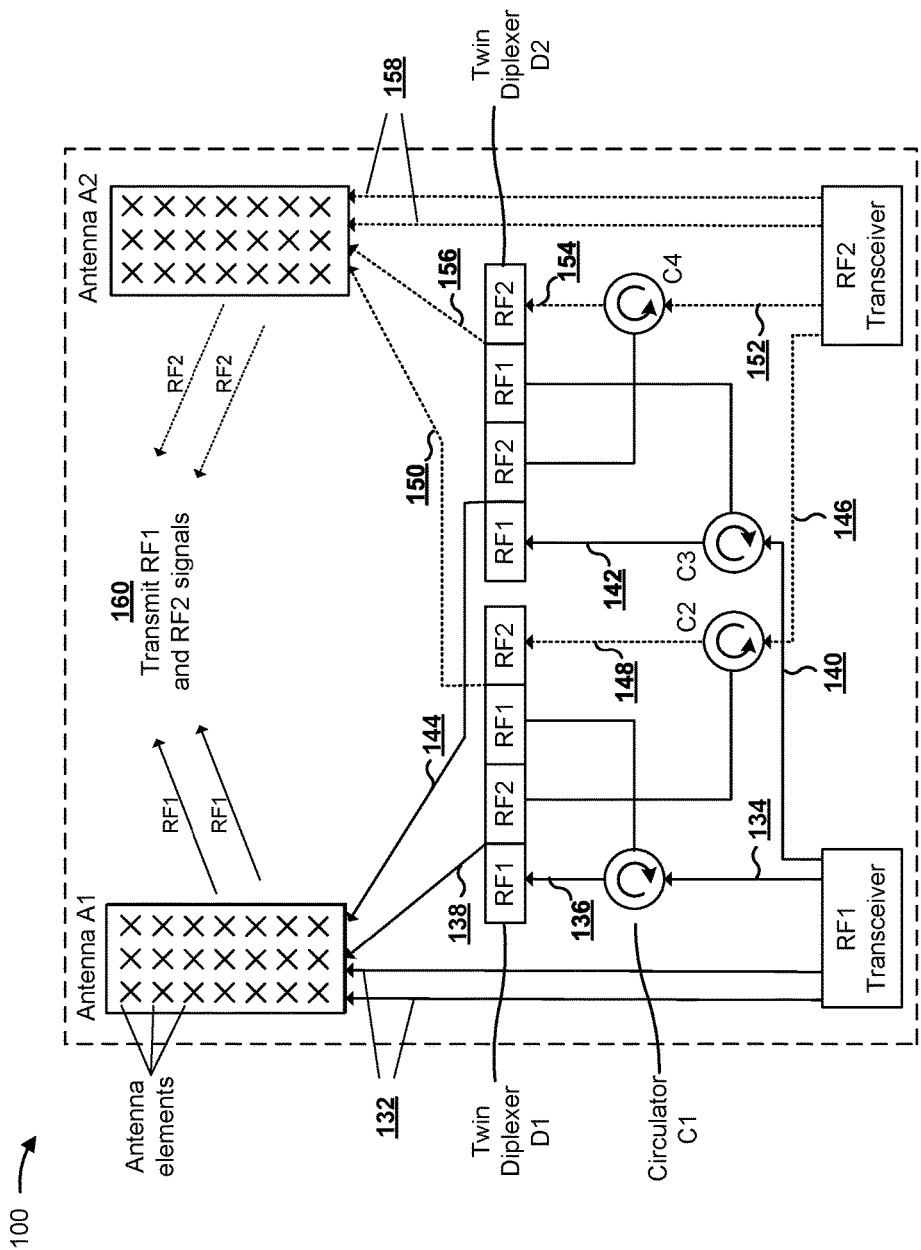

FIGS. 1A and 1B are diagrams of an overview of an example implementation 100 described herein. As shown in FIG. 1A, a base station may include multiple antennas with associated antenna elements used for receiving and/or transmitting signals, multiple transceivers, multiple twin diplexers, and/or multiple circulators. The components of the base station may be interconnected using transmission lines. FIG. 1A depicts an implementation of diversity reception by the base station.

As shown by reference number 102, the base station may receive signals associated with multiple radio frequency (RF) spectrum bands via spatially diverse antennas A1 and A2. For example, antennas A1 and A2 may receive a first signal associated with a first RF spectrum band, such as a signal associated with an advanced wireless services (AWS) band (e.g., referred to as "RF1 signal"). As another example, antennas A1 and A2 may receive a second signal associated with a second RF spectrum band, such as a signal associated with a personal communications services (PCS) band (e.g., referred to as "RF2 signal"). As shown in FIGS. 1A and 1B, the RF1 signal is shown by solid lines and the RF2 signal is shown by dotted lines.

As shown by reference number 104, the base station may provide a first portion of the RF1 signal from antenna A1 to an RF1 transceiver via one or more ports. Antenna A1 and/or the RF1 transceiver may include a filter, such as a band pass filter, that enables the RF1 transceiver to receive all portions of the RF1 signal from antenna A1 without receiving any portions of the RF2 signal.

As shown by reference number 106, the base station may provide a first portion of the RF2 signal from antenna A1 to twin diplexer D1 via a port associated with RF1 and RF2. As shown by reference number 108, the base station may provide the first portion of the RF2 signal from twin diplexer D1, via a port associated with RF2, to circulator C2. For example, the first portion of the RF2 signal may enter circulator C2 via a left port and circulate to a bottom port (e.g., the next port in rotation from the left port following the direction indicated by the arrow). As shown by reference number 110, the base station may provide the first portion of the RF2 signal from circulator C2, via the bottom port, to an RF2 transceiver.

As shown by reference number 112, the base station may also provide a second portion of the RF2 signal from antenna A1 to twin diplexer D2. As shown by reference number 114, the base station may provide the second portion of the RF2 signal from twin diplexer D2 to circulator C4. As shown by reference number 116, the base station may provide the second portion of the RF2 signal from circulator C4 to the RF2 transceiver. The base station may provide the second portion of the RF2 signal via these components in a manner similar to that described with respect to reference number 106, 108, and 110.

As shown by reference number 118, the base station may provide a second portion of the RF1 signal from antenna A2 to twin diplexer D1 via a port associated with RF1 and RF2. As shown by reference number 120, the base station may provide the second portion of the RF1 signal from twin diplexer D1, via a port associated with RF1, to circulator C1. For example, the second portion of the RF1 signal may enter circulator C1 via a right port and circulate to a bottom port (e.g., the next port in rotation from the right port following the direction indicated by the arrow). As shown by reference number 122, the base station may provide the second portion of the RF1 signal from circulator C1, via the bottom port, to the RF1 transceiver.

As shown by reference number 124, the base station may also provide a third portion the RF1 signal from antenna A2 to twin diplexer D2. As shown by reference number 126, the base station may provide the third portion of the RF1 signal from twin diplexer D2 to circulator C3. As shown by reference number 128, the base station may provide the third portion of the RF1 signal from circulator C3 to the RF1 transceiver. The base station may provide the third portion of the RF1 signal via these components in a manner similar to that described with respect to reference number 118, 120, 122.

As shown by reference number 130, the base station may provide a third portion of the RF2 signal from antenna A2 to the RF2 transceiver in a manner similar to that described with respect to reference number 104

In this way, a base station may be configured to receive a first RF signal and a second RF signal via two spatially diverse antennas, thereby enabling implementation of diversity reception via the base station.

FIG. 1B depicts an implementation of beamforming transmission by the base station. As shown in FIG. 1B, the base station may use the same configuration of components for beamforming transmission as were used for diversity reception, as described above with respect to FIG. 1A.

As shown by reference number 132, the base station may provide a first portion of an RF1 signal from the RF1 transceiver to antenna A1 via one or more ports. As shown by reference number 134, the base station may also provide the first portion of the RF1 signal from the RF1 transceiver to circulator C1. For example, the first portion of the RF1 signal may enter circulator C1 via a bottom port and circulate to a top port (e.g., the next port in rotation from the bottom port following the direction indicated by the arrow). As shown by reference number 136, the base station may provide the first portion of the RF1 signal from circulator C1, via the top port, to twin diplexer D1 via a port associated with RF1. As shown by reference number 138, the base station may provide the first portion of the RF1 signal from twin diplexer D1, via a port associated with RF1 and RF2, to antenna A1.

As shown by reference number 140, the base station may also provide a third portion of the RF1 signal from the RF1 transceiver to circulator C3. As shown by reference number 142, the base station may provide the third portion of the RF1 signal from circulator C3 to twin diplexer D2. As shown by reference number 144, the base station may provide the third portion of the RF1 signal from twin diplexer D2 to antenna A1. The base station may provide the third portion of the RF1 signal via the components in a manner similar to that described with respect to reference numbers 134, 136, 138.

As shown by reference number 146, the base station may provide a first portion of the RF2 signal from the RF2 transceiver to circulator C2. For example, the first portion of the RF2 signal may enter circulator C2 via a bottom port and circulate to a top port (e.g., the next port in rotation from the bottom port following the direction indicated by the arrow). As shown by reference number 148, the base station may provide the first portion of the RF2 signal, via the top port, from circulator C2 to twin diplexer D1 via a port associated with RF2. As shown by reference number 150, the base station may provide the first portion of the RF2 signal from twin diplexer D1, via a port associated with RF1 and RF2, to antenna A2.

As shown by reference number 152, the base station may also provide a second portion of the RF2 signal from the RF2 transceiver to circulator C4. As shown by reference number 154, the base station may provide the second portion of the RF2 signal from circulator C4 to twin diplexer D2. As shown by reference number 156, the base station may provide the second portion of the RF2 signal from twin diplexer D2 to antenna A2. The base station may provide the second portion of the RF2 signal via the components in a manner similar to that described with respect to reference numbers 146, 148, and 150.

As shown by reference number 158, the base station may also provide a third portion of the RF2 signal from the RF2 transceiver to antenna A2 in a manner similar to that described with respect to reference number 132. As shown by reference number 160, the base station may transmit the RF1 signal via antenna A1 and the RF2 signal via antenna A2.

In this way, components of a base station may be configured to receive signals associated with multiple RF spectrum bands via spatially diverse antenna elements (e.g., antenna elements associated with two spatially diverse antennas). In addition, the same configuration may enable the base station to transmit signals associated with the multiple RF spectrum bands via spatially proximate antenna elements (e.g., antenna elements associated with a single antenna). This may enable the base station to be configured to implement diversity reception and beamforming transmission using a configuration of components for the base station, thereby improving reception and transmission of signals via the base station.

As indicated above, FIGS. 1A and 1B are provided merely as examples. Other examples are possible and may differ from what was described with regard to FIGS. 1A and 1B.

Figure 2:
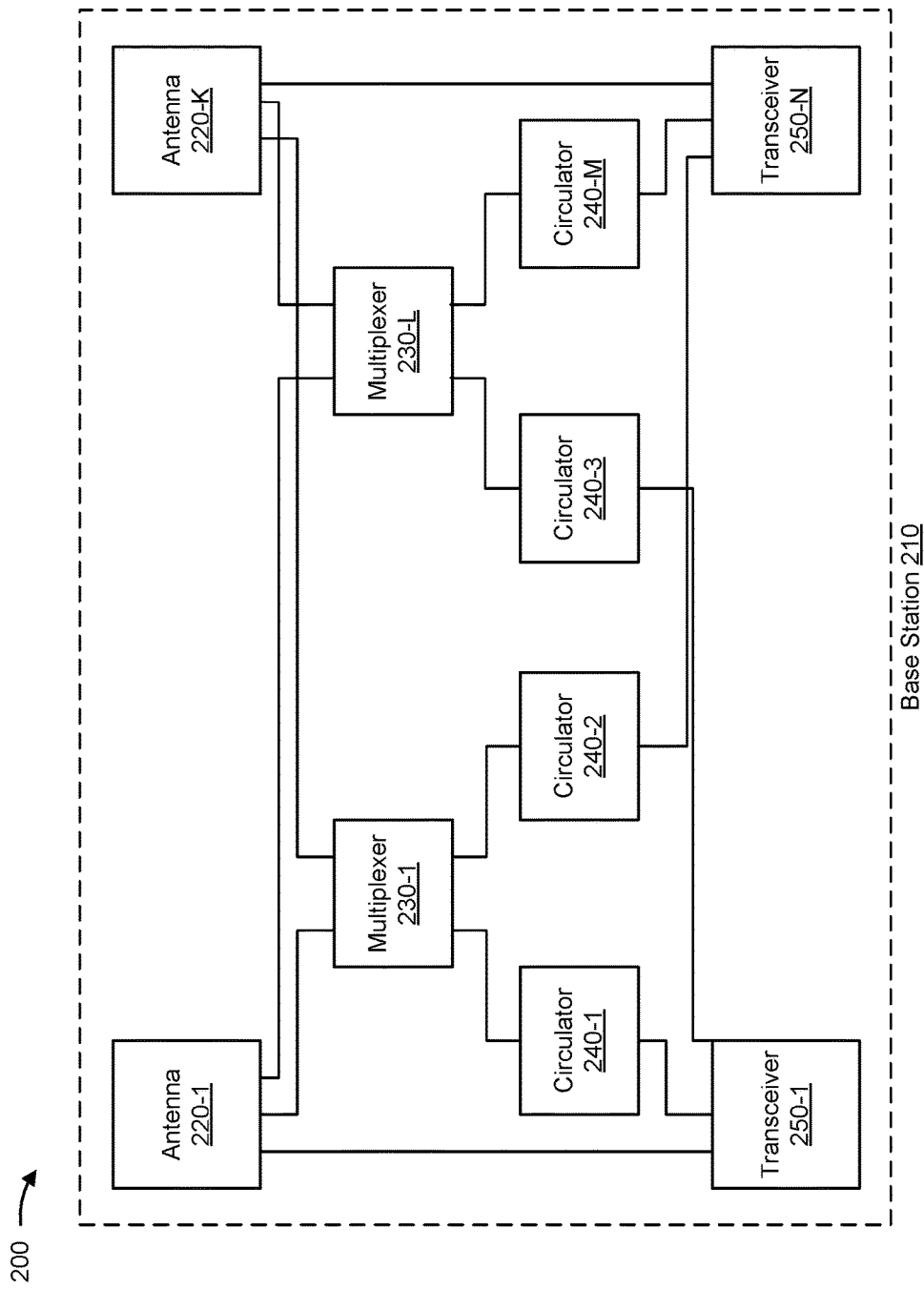
FIG. 2 is a diagram of a portion of example components of a device described herein.

FIG. 2 is a diagram of device 200 and a portion of example components of device 200 in which systems and/or methods, described herein, may be implemented. Device 200 may correspond to base station 210. As shown in FIG. 2, base station 210 may include one or more antennas 220-1 through 220-K (K≥1) (hereinafter referred to collectively as "antennas 220," and individually as "antenna 220"), one or more multiplexers 230-1 through 230-L (L≥1) (hereinafter referred to collectively as "multiplexers 230," and individually as "multiplexer 230"), one or more circulators 240-1 through 240-M (M≥1) (hereinafter referred to collectively as "circulators 240," and individually as "circulator 240"), and/or one or more transceivers 250-1 through 250-N (N≥1) (hereinafter referred to collectively as "transceivers 250," and individually as "transceiver 250"). In some implementations, base station 210 may include at least two antennas 220, at least two multiplexers 230, at least four circulators 240, and at least two transceivers 250. In some implementations, components of FIG. 2 may interconnect via wired connections, such as transmission lines (e.g., as shown by solid lines between the components of FIG. 2), wireless connections, or a combination of wired and wireless connections.

Base station 210 includes one or more components capable of transferring traffic, such as audio, video, text, and/or other traffic, destined for and/or received from a user device. In some implementations, base station 210 may include an evolved Node B (eNB) associated with a long term evolution (LTE) network that receives traffic from and/or sends traffic to an external network via a serving gateway (SGW) and/or a packet data network gateway (PGW). Additionally, or alternatively, one or more base stations 210 may be associated with a radio access network (RAN) that is not associated with the LTE network. Base station 210 may send traffic to and/or receive traffic from a user device via an air interface. In some implementations, base station 210 may include a small cell base station, such as a base station of a microcell, a picocell, and/or a femtocell.

Antenna 220 includes one or more components capable of receiving and/or transmitting signals. For example, antenna 220 may include one or more directional and/or omnidirectional antennas. In some implementations, antenna 220 may include one or more antenna elements, such as driven elements or active elements, which may be used to receive and/or transmit signals via antenna 220. For example, the antenna elements may include one or more 45 degree slant polarization antennas or vertically polarized dipole antennas. Antenna 220 may be connected to and/or may communicate with one or more other components of base station 210 (e.g., multiplexer 230 and/or transceiver 250). Additionally, or alternatively, antenna 220 may receive wireless signals from and/or transmit wireless signals to a device external from base station 210 (e.g., a user device) via an air interface.

Multiplexer 230 includes one or more components capable of multiplexing signals (e.g., using frequency-domain multiplexing). For example, multiplexer 230 may include a diplexer, a twin diplexer, a triplexer, a quadplexer, or a similar type of device. Multiplexer 230 may be connected to and/or may communicate with one or more other components of base station 210 (e.g., antenna 220 and/or circulator 240). In some implementations, multiplexer 230 may receive multiple signals (e.g., RF signals) via a single port, may separate the multiple signals, and may provide separate signals via separate ports. Additionally, or alternatively, multiplexer 230 may receive multiple signals via separate ports, may combine (e.g., multiplex) the multiple signals, and may provide the multiple signals via the single port. Antenna 220 may receive signals from and/or provide signals to one or more other components of base station 210 (e.g., multiplexer 230 and/or transceiver 250).

Circulator 240 includes one or more components capable of receiving a signal via a first port and providing the signal via a second port (e.g., a next consecutive port in a sequence of ports). For example, circulator 240 may include a ferrite circulator or a non-ferrite circulator, such as a three-port Y-junction circulator or a four-port circulator. Circulator 240 may be connected to and/or may communicate with one or more other components of base station 210 (e.g., multiplexer 230 and/or transceiver 250). In some implementations, circulator 240 may receive a signal from a first component of base station 210 (e.g., multiplexer 230 and/or transceiver 250), and may provide the signal to a second component of base station 210 (e.g., multiplexer 230 and/or transceiver 250).

Transceiver 250 includes one or more components capable of transmitting and receiving a signal. For example, transceiver 250 may include a transceiver, a separate transmitter and receiver, a remote radio unit (e.g., a remote radio head), or a similar type of device. Transceiver 250 may be connected to and/or may communicate with one or more other components of base station 210 (e.g., antenna 220 and/or circulator 240). In some implementations, transceiver 250 may communicate with a baseband unit (not shown) that connects to a core network.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of device 200 may perform one or more functions described as being performed by another set of components of device 200.

Figure 3:
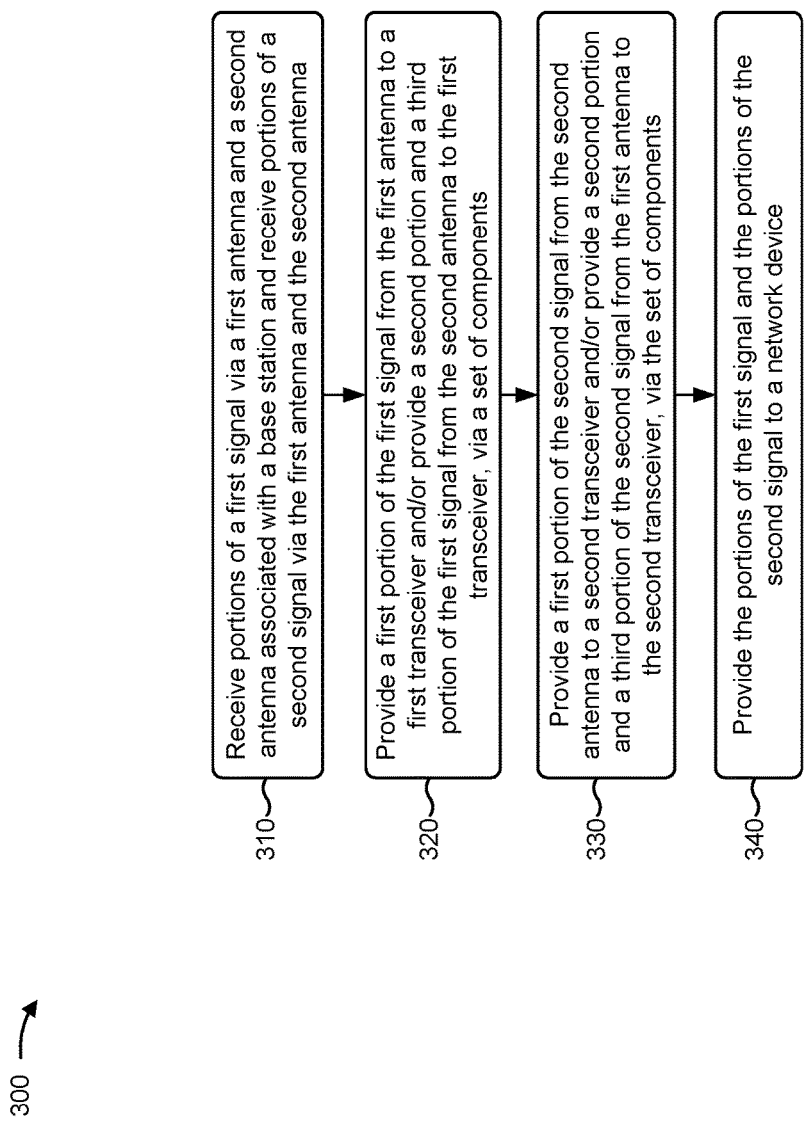
FIG. 3 is a flow chart of an example process for implementing diversity reception using a configuration of components of a base station.

FIG. 3 is a flow chart of an example process 300 for implementing diversity reception using a configuration of components of a base station. In some implementations, one or more process blocks of FIG. 3 may be performed by base station 210. In some implementations, one or more process blocks of FIG. 3 may be performed by one or more components of base station 210, such as antenna 220, multiplexer 230, circulator 240, and/or transceiver 250.

As shown in FIG. 3, process 300 may include receiving portions of a first signal via a first antenna and a second antenna associated with a base station and receiving portions of a second signal via the first antenna and the second antenna (block 310). For example, base station 210 may receive a first RF signal and a second RF signal from one or more user devices. In some implementations, base station 210 may receive portions of the first signal via the first antenna and the second antenna. Additionally, or alternatively, base station 210 may receive portions of the second signal via the first antenna and the second antenna.

In some implementations, the first antenna 220 and the second antenna 220 may include antenna elements for receiving the first signal and the second signal. In some implementations, the first antenna 220 and the second antenna 220 may be spatially diverse. For example, the first antenna 220 and the second antenna 220 may be physically spaced by greater than a threshold quantity of wavelengths of frequency, such as greater than one wavelength of frequency or greater than 10 wavelengths of frequency. In some implementations, the spatial diversity of the first antenna 220 and the second antenna 220 may enable spatial diversity of the antenna elements associated with the first antenna 220 and the second antenna 220.

In this way, base station 210 may receive portions of a signal via two spatially diverse antennas 220, which may enable implementation of diversity reception. This improves reception of the signal by providing multiple observations of the signal, as described elsewhere herein.

As further shown in FIG. 3, process 300 may include providing a first portion of the first signal from the first antenna to a first transceiver and/or providing a second portion and a third portion of the first signal from the second antenna to the first transceiver, via a set of components (block 320). For example, the first antenna 220 may be connected with the first transceiver 250 via one or more transmission lines (e.g., two-way transmission lines, such as coaxial cables, striplines, or optical fibers). In some implementations, the transmission lines may be associated with ports of the components (e.g., two-way ports that permit two-way signal traffic).

In some implementations, base station 210 may provide the first portion of the first signal to a first transceiver 250, associated with a first RF spectrum band, via the one or more transmission lines. For example, base station 210 may provide the first portion of the first signal from the first antenna 220 directly to the first transceiver 250. In some implementations, the first antenna 220 and/or the first transceiver 250 may include a filter, such as a band pass filter, to enable base station 210 to provide the first portion of the first signal directly to the first transceiver 250 without providing a portion of a second signal to the first transceiver 250.

In some implementations, base station 210 may provide the second portion of the first signal from the second antenna 220 to the first transceiver 250 via a first set of components. For example, base station 210 may provide the second portion of the first signal from the second antenna 220 to the first transceiver 250 via one or more components of base station 210, such as one or more multiplexers 230 and/or one or more circulators 240. In some implementations, base station 210 may provide the second portion of the first signal from the second antenna 220 to a first multiplexer 230 connected with a first circulator 240 and a second circulator 240. In some implementations, base station 210 may provide the second portion of the first signal from the first multiplexer 230 to the first circulator 240 and from the first circulator 240 to the first transceiver 250.

In some implementations, base station 210 may provide the third portion of the first signal from the second antenna 220 to the first transceiver 250 via a second set of components. For example, base station 210 may provide the third portion of the first signal from the second antenna 220 to a second multiplexer 230 connected with a third circulator 240 and a fourth circulator 240. In some implementations, base station 210 may provide the third portion of the first signal from the second multiplexer 230 to the third circulator 240 and from the third circulator 240 to the first transceiver 250.

In this way, base station 210 may provide a first portion of a first signal received by a first antenna 220 to a first transceiver 250 directly and/or provide a second portion and a third portion of the first signal received by a second antenna 220 to the first transceiver 250 via a set of components of base station 210.

As further shown in FIG. 3, process 300 may include providing a first portion of the second signal from the second antenna to a second transceiver and/or providing a second portion and a third portion of the second signal from the first antenna to the second transceiver, via the set of components (block 330). For example, the second antenna 220 may be connected with the second transceiver 250 via one or more transmission lines. In some implementations, base station 210 may provide portions (e.g., the first portion, the second portion, and/or the third portion) of the second signal to the second transceiver 250 via the one or more transmission lines.

In some implementations, base station 210 may provide the first portion of the second signal from the second antenna 220 directly to the second transceiver 250. In some implementations, the second antenna 220 and/or the second transceiver 250 may include a filter to enable base station 210 to provide the first portion of the second signal directly to the second transceiver 250 without providing a portion of the first signal to the second transceiver 250.

In some implementations, base station 210 may provide the second portion of the second signal from the first antenna 220 to the second transceiver 250 via a third set of components. For example, base station 210 may provide the second portion of the second signal from the first antenna 220 to the first multiplexer 230. In some implementations, base station 210 may provide the second portion of the second signal from the first multiplexer 230 to the second circulator 240 and from the second circulator 240 to the second transceiver 250.

In some implementations, base station 210 may provide the third portion of the second signal from the first antenna 220 to the second transceiver 250 via a fourth set of components. For example, base station 210 may provide the third portion of the second signal from the first antenna 220 to the second multiplexer 230. In some implementations, base station 210 may provide the third portion of the second signal from the second multiplexer 230 to the fourth circulator 240 and from the fourth circulator 240 to the second transceiver 250.

In this way, base station 210 may provide a first portion of a second signal received by a second antenna 220 to a second transceiver 250 directly and/or provide a second portion and a third portion of the second signal received by a first antenna 220 to the second transceiver 250 via a set of components of base station 210.

As further shown in FIG. 3, process 300 may include providing the portions of the first signal and the portions of the second signal to a network device (block 340). For example, base station 210 may provide the portions of the first signal and the portions of the second signal to a mobility management entity (MME) or an SGW. In some implementations, base station 210 may provide the portions of the first signal and the portions of the second signal to the network device via one or more wired or wireless connections.

In this way, base station 210 may be configured using one or more components to implement diversity reception, thereby improving reception of one or more signals via the one or more components.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 4 is a flow chart of an example process 400 for implementing beamforming transmission using the same configuration of components of the base station as described with respect to FIG. 3. In some implementations, one or more process blocks of FIG. 4 may be performed by base station 210. In some implementations, one or more process blocks of FIG. 4 may be performed by one or more components of base station 210, such as antenna 220, multiplexer 230, circulator 240, and/or transceiver 250.

As shown in FIG. 4, process 400 may include providing a first portion of a first signal from a first transceiver to a first antenna, associated with a base station, for transmission via the first antenna (block 410). For example, base station 210 may provide a first portion of the first signal from the first transceiver 250 directly to the first antenna 220 via one or more transmission lines. In some implementations, base station 210 may provide a second portion and a third portion of the first signal to the first antenna 220 via a set of components of base station 210, as described below.

In some implementations, base station 210 may provide the first portion of the first signal to the first antenna 220 in association with implementing beamforming transmission. For example, antenna 220 may be associated with one or more antenna elements. In some implementations, the antenna elements may be spatially proximate based on being associated with the first antenna 220. For example, the antenna elements may be physically spaced less than a threshold quantity of wavelengths of frequency, such as less than one wavelength of frequency or less than 10 wavelengths of frequency.

In this way, base station 210 may provide the first portion of the first signal to the first antenna 220, and not to the second antenna 220, for transmission. This enables beamforming transmission via use of spatially proximate antenna elements, associated with the first antenna 220, for transmission of the first signal.

As further shown in FIG. 4, process 400 may include providing a second portion and a third portion of the first signal from the first transceiver to the first antenna, via a set of components, for transmission via the first antenna (block 420). For example, base station 210 may provide a second portion and a third portion of the first signal to the first antenna 220 via one or more multiplexers 230 and/or one or more circulators 240. In some implementations, base station 210 may provide the second portion and the third portion of the first signal via the one or more transmission lines.

In some implementations, base station 210 may provide the second portion of the first signal to the first antenna 220 via the first set of components. For example, base station 210 may provide the second portion of the first signal from the first transceiver 250 to the first multiplexer 230 via the first circulator 240. In some implementations, base station 210 may provide the second portion of the first signal from the first multiplexer 230 to the first antenna 220 for transmission via the first antenna 220. In some implementations, base station 210 may provide the third portion of the first signal to the first antenna 220 via the second set of components. For example, base station 210 may provide the third portion of the first signal from the first transceiver 250 to the second multiplexer 230 via the third circulator 240. In some implementations, base station 210 may provide the third portion of the first signal from the second multiplexer 230 to the first antenna 220 for transmission via the first antenna 220.

In some implementations, base station 210 may provide a complete signal from transceiver 250 to antenna 220 (e.g., rather than providing portions of a signal to antenna 220). In this way, base station 210 may provide a first signal and/or one or more portions of the first signal to the first antenna 220, and not to the second antenna 220, for transmission. This enables implementation of beamforming transmission via use of spatially proximate antenna elements, associated with the first antenna 220, for transmission of the first signal.

As further shown in FIG. 4, process 400 may include transmitting the first signal via the first antenna (block 430). For example, base station 210 may transmit the first signal and/or the portions of the first signal (e.g., the first portion, the second portion, and/or the third portion) via spatially proximate antenna elements associated with the first antenna 220. In some implementations, when base station 210 is transmitting the portions of the first signal, base station 210 may combine the portions to form a complete signal (e.g., by using a combiner) in association with transmitting the first signal.

In some implementations, when base station 210 is transmitting the first signal via antenna 220 using beamforming transmission, base station 210 may provide the portions of the first signal to the antenna elements associated with antenna 220 for transmission. In this way, base station 210 may use beamforming transmission when transmitting the first signal via the first antenna 220, thereby improving a transmission of the first signal.

As further shown in FIG. 4, process 400 may include providing a first portion of a second signal from a second transceiver to a second antenna, associated with the base station, for transmission via the second antenna (block 440). For example, base station 210 may provide the first portion of the second signal from the second transceiver 250 directly to the second antenna 220 via the one or more transmission lines. In some implementations, base station 210 may provide a second portion and a third portion of the second signal to the second antenna 220 via the set of components of base station 210, as described below.

In some implementations, base station 210 may provide the first portion of the second signal to the second antenna 220 in association with implementing beamforming transmission. For example, the second antenna 220 may be associated with one or more antenna elements. In some implementations, the antenna elements may be spatially proximate based on being associated with the second antenna 220.

In this way, base station 210 may provide the first portion of the second signal to the second antenna 220, and not to the first antenna 220, for transmission. This enables implementation of beamforming transmission via use of spatially proximate antenna elements associated with the second antenna 220 for transmission of the second signal.

As further shown in FIG. 4, process 400 may include providing a second portion and a third portion of the second signal from the second transceiver to the second antenna, via the set of components, for transmission via the second antenna (block 450). For example, base station 210 may provide the second portion and the third portion of the second signal via the one or more multiplexers 230 and/or the one or more circulators 240.

In some implementations, base station 210 may provide the second portion of the second signal to the second antenna 220 via the third set of components. For example, base station 210 may provide the second portion of the second signal from the second transceiver 250 to a first multiplexer 230 via the second circulator 240. In some implementations, base station 210 may provide the second portion of the second signal from the first multiplexer 230 to the second antenna 220 for transmission via the second antenna 220. In some implementations, base station 210 may provide the third portion of the second signal to the second antenna 220 via the fourth set of components. For example, base station 210 may provide the third portion of the second signal from the second transceiver 250 to the second multiplexer 230 via the fourth circulator 240. In some implementations, base station 210 may provide the third portion of the second signal from the second multiplexer 230 to the second antenna 220 for transmission via the second antenna 220.

In some implementations, base station 210 may provide a complete signal from transceiver 250 to antenna 220 (e.g., rather than providing portions of a signal to antenna 220). In this way, base station 210 may provide a second signal and/or one or more portions of the second signal to the second antenna 220, and not to the first antenna 220, for transmission. This enables implementation of beamforming transmission via use of spatially proximate antenna elements, associated with the second antenna 220, for transmission of the second signal.

As further shown in FIG. 4, process 400 may include transmitting the second signal via the second antenna (block 460). For example, base station 210 may transmit the second signal via spatially proximate antenna elements associated with the second antenna 220. In some implementations, when base station 210 is transmitting the portions of the second signal (e.g., the first portion, the second portion, and/or the third portion), base station 210 may combine the portions to form a complete signal (e.g., by using a combiner) in association with transmitting the second signal.

In some implementations, when base station 210 is transmitting the second signal via antenna 220 using beamforming transmission, base station 210 may provide the portions of the second signal to the antenna elements associated with the second antenna 220 for transmission. In this way, base station 210 may use beamforming transmission when transmitting the second signal via the second antenna 220, thereby improving a transmission of the second signal.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable components of a base station to be configured to enable diversity reception for reception of one or more signals and beamforming transmission for transmission of the one or more signals. This improves the reception and/or the transmission of the one or more signals through concurrent implementation of diversity reception and beamforming transmission techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   a first antenna to receive a first portion of a first signal, associated with a first radio frequency (RF) spectrum band, and one or more first portions of a second signal associated with a second RF spectrum band;
   a second antenna to receive one or more second portions of the first signal, associated with the first RF spectrum band, and a second portion of the second signal associated with the second RF spectrum band;
   a first set of components to receive the first portion of the first signal and the one or more second portions of the first signal,
      the first set of components including:
         a first transceiver,
         a first multiplexer connected to a first circulator and a second circulator,
         a second multiplexer connected to a third circulator and a fourth circulator,
         the first circulator, and
         the third circulator; and
   a second set of components to receive the one or more first portions of the second signal and the second portion of the second signal,
      the second set of components including:
         a second transceiver,
         the first multiplexer,
         the second multiplexer,
         the second circulator, and
         the fourth circulator.

2. The base station of claim 1, where:
   the first antenna is to provide the first portion of the first signal from the first antenna to the first transceiver;
   the second antenna is to provide the second portion of the second signal from the second antenna to the second transceiver;
   the first antenna is to provide the one or more first portions of the second signal from the first antenna to the second transceiver via the first multiplexer and the second circulator and via the second multiplexer and the fourth circulator; and
   the second antenna is to provide the one or more second portions of the first signal from the second antenna to the first transceiver via the first multiplexer and the first circulator and via the second multiplexer and the third circulator.

3. The base station of claim 1, where:
the first antenna is further to transmit a third signal,
the third signal being received, by the first antenna, via the first set of components, and
the third signal being associated with the first RF spectrum band; and
the second antenna is further to transmit a fourth signal,
the fourth signal being transmitted, by the second antenna, via the second set of components, and
the fourth signal being associated with the second RF spectrum band.

4. The base station of claim 3, where the first set of components or the second set of components is to:
provide a first portion of the third signal from the first transceiver to the first antenna;
provide a second portion of the third signal and a third portion of the third signal from the first transceiver to the first antenna via the first multiplexer, the second multiplexer, the first circulator, and the third circulator;
provide a first portion of the fourth signal from the second transceiver to the second antenna; or
provide a second portion of the fourth signal and a third portion of the fourth signal from the second transceiver to the second antenna via the first multiplexer, the second multiplexer, the second circulator, and the fourth circulator.

5. The base station of claim 1, where the first multiplexer is a first diplexer and the second multiplexer is a second diplexer.

6. The base station of claim 1, where the first antenna and the second antenna are separated by at least ten wavelengths of frequency of the first RF spectrum band and the second RF spectrum band.

7. The base station of claim 1, where antenna elements associated with the first antenna or the second antenna are separated by less than one wavelength of frequency of the first RF spectrum band or the second RF spectrum band.

8. A base station, comprising:
a first antenna connected to a first transceiver, a first multiplexer, and a second multiplexer;
a second antenna connected to a second transceiver, the first multiplexer, and the second multiplexer;
a first circulator connected to the first transceiver and the first multiplexer;
a second circulator connected to the second transceiver and the first multiplexer;
a third circulator connected to the first transceiver and the second multiplexer; and
a fourth circulator connected to the second transceiver and the second multiplexer.

9. The base station of claim 8, where the first antenna and the second antenna are to:
receive a first signal associated with a first radio frequency (RF) spectrum band, and
receive a second signal associated with a second RF spectrum band.

10. The base station of claim 8, where the first antenna is to transmit a first signal associated with a first radio frequency (RF) spectrum band, and
where the second antenna is to transmit a second signal associated with a second RF spectrum band.

11. The base station of claim 8, where the first antenna and the second antenna are spaced greater than ten wavelengths of frequency of a first radio frequency (RF) spectrum band and a second RF spectrum band.

12. The base station of claim 8, where the first antenna and the second antenna each includes antenna elements spaced less than one wavelength of frequency of a first radio frequency (RF) spectrum band and a second RF spectrum band.

13. The base station of claim 8, where the first multiplexer and the second multiplexer are twin diplexers.

14. The base station of claim 8, further comprising:
a first band pass filter to prevent the first transceiver from receiving signals associated with a first radio frequency (RF) spectrum band, and
a second band pass filter to prevent the second transceiver from receiving signals associated with a second RF spectrum band.

15. A method, comprising:
transmitting, by a base station and via a first antenna, a first signal using a beamforming transmission technique; and
receiving, by the base station and via the first antenna and a second antenna, a second signal using a diversity reception technique,
a first portion of the second signal being received by the first antenna,
a second portion of the second signal being received by the second antenna, and
receiving the second signal includes:
providing the first portion of the second signal from the first antenna to a transceiver; and
providing the second portion of the second signal from the second antenna to the transceiver via a first multiplexer and a first circulator or via a second multiplexer and a second circulator.

16. The method of claim 15, where transmitting the first signal comprises:
providing a first portion of the first signal from a transceiver to the first antenna;
providing a second portion of the first signal from the transceiver to the first antenna via a first circulator and a first multiplexer; and
providing a third portion of the first signal from the transceiver to the first antenna via a second circulator and a second multiplexer.

17. The method of claim 15, where:
the first signal is associated with a first radio frequency (RF) spectrum band, and
the second signal is associated with a second RF spectrum band.

18. The method of claim 15, where the first antenna and the second antenna are geographically separated by more than ten wavelengths of a radio frequency (RF) spectrum band.

19. The method of claim 15, where:
the first antenna or the second antenna include antenna elements,
the antenna elements being geographically separated by less than one wavelength of a radio frequency (RF) spectrum band.

20. The method of claim 17, where:
the first RF spectrum band is an advanced wireless services (AWS) band; and
the second RF spectrum band is a personal communications services (PCS) band.

* * * * *